Oct. 15, 1940.                G. W. WILLARD                2,218,225
                        PIEZOELECTRIC APPARATUS
           Original Filed June 2, 1934        3 Sheets-Sheet 1
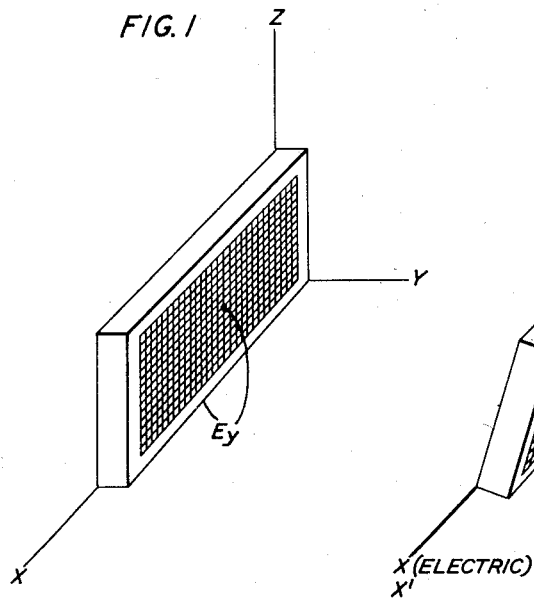
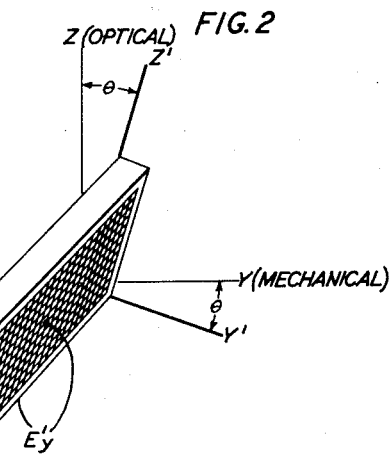
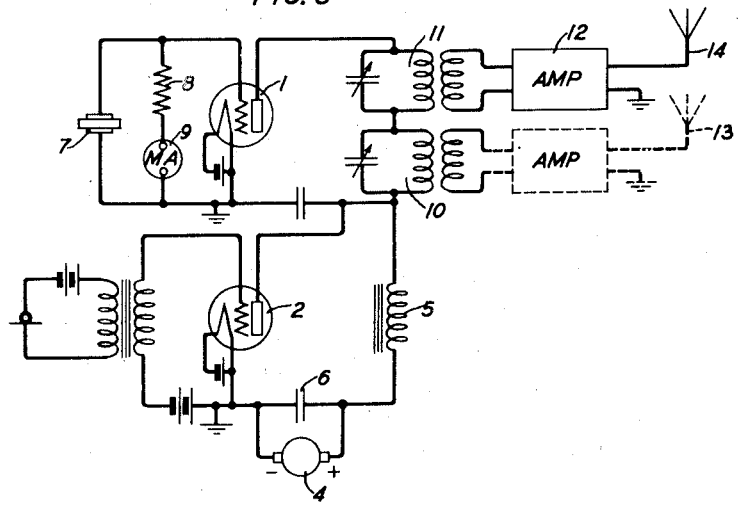
INVENTOR
G. W. WILLARD
BY W. J. O'Neill
ATTORNEY Oct. 15, 1940.                G. W. WILLARD                2,218,225
                        PIEZOELECTRIC APPARATUS
             Original Filed June 2, 1934        3 Sheets—Sheet 3

INVENTOR
G. W. WILLARD
BY W. J. O'Neill
ATTORNEY

Patented Oct. 15, 1940

2,218,225

UNITED STATES PATENT OFFICE 2,218,225

PIEZOELECTRIC APPARATUS

Gerald W. Willard, Fanwood, N. J., assignor to Bell Telephone Laboratories, Incorporated, New York, N. Y., a corporation of New York Original application June 2, 1934, Serial No. 728,640. Divided and this application April 7, 1937, Serial No. 135,395. In Canada May 3, 1935

19 Claims. (Cl. 171—327)

This invention relates to piezoelectric apparatus and more particularly to the orientation of the principal faces of a piezoelectric plate to control the effects of temperature upon its resonance frequency.

This sole application is a division of a joint application, Serial No. 728,640, filed June 2, 1934, by F. R. Lack, I. E. Fair and the present applicant herein, G. W. Willard.

It is well known that the resonance frequencies of vibrating plates of piezoelectric materials such as quartz and tourmaline depend both upon the dimensions of the plates and the relation between their surfaces and the orthogonal axes of the mother crystal. This is for the reason that such substances are aelotropic and unlike isotropic substances have different "elastic constants" in different directions.

It is also well known that the resonance frequencies of such plates are, in general, not simple functions of a single dimension for extensional or shear vibrations, or of two dimensions for flexural vibrations, but are complex and depend upon couplings of the desired modes of vibration to extraneous modes of vibration. It has been shown in the application of Mason and Sykes, Serial No. 702,334, filed December 14, 1933, now U. S. Patent No. 2,173,589, dated September 19, 1939, how these couplings may be reduced or eliminated so that the vibrating plates may have a resonance frequency which is effectively a simple function of a single dimension. Moreover, with freedom from coupling between vibrations of a desired mode and extraneous vibrations, the resonance or reactance characteristics of the device in the region of the desired frequency approach those of a simple tuned circuit thus enabling the electrical reactances of such plates to be definitely predicted so that the plates may be constructed and incorporated in selective circuits or frequency control paths in accordance with the principles of design employed for ordinary tuned electrical reactances.

As the temperature of a piezoelectric plate is changed the dimensions, the density and the elastic constants of the plate also tend to change. This brings about a change in the natural resonance frequency of the plate. The temperature coefficient of frequency for quartz plates of the usual Y cut or parallel face cut crystals varies from $+80$ to $+90$ cycles per million per degree C. at ordinary room temperatures; that of the X cut or perpendicular face cut ranges from $-20$ to $-30$ cycles per million per degree C. This has made it necessary where extreme constancy of frequency is required as, for example, in frequency control of high frequency oscillators and in frequency standards, to provide expensive and bulky temperature controlled housings for such plates.

Piezoelectric plates having zero temperature coefficient for a limited range of temperatures and under special conditions have been described in the art. Because the frequency response of such plates has generally depended upon the coupling between two or more types of vibrations, it has not been feasible to clamp such plates sufficiently to prevent shifting with respect to their electrodes when subjected to shocks or jars since one of the coupled types of vibration is inhibited by the clamping.

If the piezoelectric plate is not clamped there is a likelihood that it may shift in position when subjected to shocks or jars or even in consequence of its own vibration. Since the plate surfaces and those of their adjacent electrodes are never absolutely true parallel planes, any shifting of the plate which occurs is likely to vary the dielectric capacity between the electrodes and thus to affect the frequency characteristics of the device. There is also likely to be a relative shifting of the surface of the crystal with respect to the surfaces of its electrodes so that their actual points of contact may from time to time be quite different. It is, moreover, frequently found in practice that crystal plates which will vibrate satisfactorily in a stationary apparatus will not operate at all when subjected to the external shocks encountered in operation in mobile apparatus such as aircraft. Consequently it has hitherto been impossible to use zero temperature coefficient crystals for aircraft where it has been necessary to clamp the crystals to maintain their characteristic performance during flight the same as that to which they were initially adjusted. Moreover, such zero temperature coefficient plates as have been hitherto available are of rather limited utility even for stationary systems since the range of temperatures throughout which they possess that characteristic is relatively limited. This has made it necessary that the crystal plate be ground not only to have the desired frequency and to have zero temperature coefficient, but also to exhibit both of these desired characteristics at the same definite temperature or within the same temperature range. Unless this range may readily be made to include that of the environment within which the crystal plate is to be used, the design becomes very difficult or practically impossible and the zero temperature characteristic cannot be utilized to its full extent. In aircraft operation wide ranges of temperature are encountered.

The frequency of vibration of a piezoelectric body in a particular mode of vibration as has been previously stated is a function of the dimensions of the body, the density of the substance, and the elastic constants which relate mechanical stresses to corresponding mechanical strains. As the temperature of such a body varies, its dimensions, its density and its elastic constants are each affected. It follows, therefore, that the temperature coefficient of frequency of a particular piezoelectric plate will be a function of various other temperature coefficients of that same plate. The temperature coefficient of frequency may, therefore, be made zero by application of any expedient which will cause the temperature coefficients of which it is a function to compensate for each other in their aggregate effect.

According to this invention the temperature coefficient of frequency of a piezoelectric plate is made zero by so cutting the piezoelectric plate from the mother crystal that the relative position of its surfaces with respect to the orthogonal axes of the mother crystal results in the compensatory relationship between the various components which together make up the temperature coefficient of the plate. In the case of quartz this involves a rotation or orientation about one or more of the orthogonal X, Y and Z axes of the mother crystal so that the principal faces of the resulting plate are no longer parallel to two of the axes but are inclined to two of the axes or to all three.

It will be recalled that quartz and tourmaline occur in two forms, namely right-hand and left-hand. A crystal is designated as right-hand if it rotates the plane of polarization of plane polarized light traveling along the optical or Z axis in a right-hand direction and is designated as left-hand if it rotates the plane of polarization to the left. If a compressional stress be applied to the ends of the electric axis of a quartz body and not removed, a charge will be developed which is positive at the positive end of the electric axis and negative at the negative end of the axis for either right-hand or left-hand crystals. The amplitude and sign of the charge may be measured with a vacuum tube electrometer. In specifying the orientation of the right-hand crystal, the angle $\theta$ which the new axis Z' makes with the optical axis Z as the crystal plate is rotated about the X (electric) axis is deemed positive when with the positive end of the X axis pointed toward the observer the rotation is in a clockwise direction. A counter-clockwise rotation of such a crystal gives rise to a negative orientation angle. Conversely, the orientation angle of a left-hand crystal is positive when with the positive end of the electric axis pointed toward the observer the rotation is counter-clockwise and is negative when the rotation is clockwise. In one species of the invention as applied to quartz the principal faces are parallel to an X or electric axis and are oriented or inclined at a positive angle of approximately +35°20' with respect to the optical axis as disclosed and claimed in the copending joint application Serial No. 728,640, hereinbefore referred to. In another species the faces are inclined at an angle of —49° with respect to the optical axis.

An object of the present invention is to produce a piezoelectric plate which will have zero temperature coefficient of frequency.

An additional object of the invention is to produce a piezoelectric element that may have any desired predetermined temperature coefficient.

Another object of the invention is to produce a piezoelectric plate which will have a natural frequency that is relatively independent of changes in temperature over a range of temperatures to permit temperature regulating apparatus to be simplified or eliminated and a constant vibration frequency to be maintained.

Another object of the invention is to produce a piezoelectric plate having zero or small temperature coefficient of frequency which will at the same time have a natural vibration frequency that is relatively independent of couplings with extraneous vibrations of undesired frequencies.

An additional object is to provide a piezoelectric plate having a zero or low temperature coefficient of frequency which may be clamped so as to withstand vibration or a tendency to shift its position with respect to the electrodes.

Another object is to provide a piezoelectric element that will control a larger amount of power in an oscillator than has been hitherto possible.

An additional object is to permit the use of piezoelectric plates of higher frequencies than it has been possible to use heretofore.

Other features and advantages of the invention will be apparent from a consideration of the following description taken in connection with the drawings in which:

Fig. 1 illustrates a conventional Y cut or parallel face cut quartz plate;

Fig. 2 shows one species of a quartz plate having an orientation in accordance with the invention;

Fig. 3 shows a circuit employing a piezoelectric element of the type shown in Fig. 2;

Figure 4:
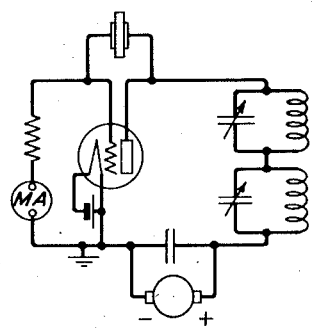
Fig. 4 shows a modification of the circuit of Fig. 3.
Figure 11:
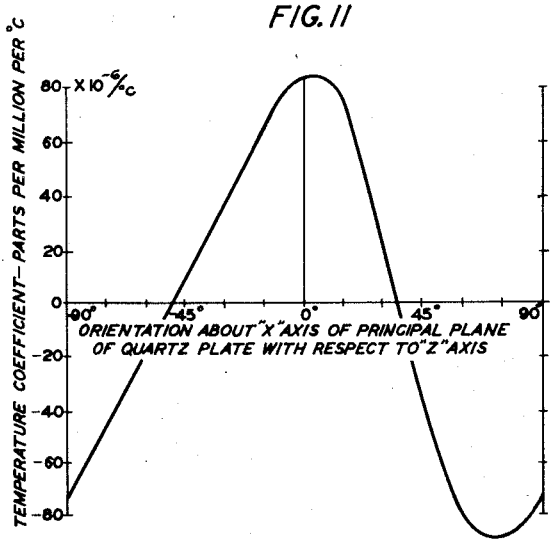

Figs. 5 to 10, inclusive, show details of two forms of crystal plates and mountings for use in connection with the circuits of Figs. 3 and 4; and Fig. 11 shows a graph of the temperature coefficient of frequency of quartz plates for one type of vibrations for different orientations about the X axis.

A quartz plate may differ from the usual Y cut crystal plate and its orientation in that its principal faces instead of being parallel to both the electrical and optical axes are inclined to the optical axis by such an angle $\theta =$ substantially +31 or —59° as to reduce coupling between certain shear frequency vibrations and other modes of vibration. These shear frequency vibrations which are really in the nature of transverse vibrations are attended with a motion of the particles in a direction perpendicular to that of propagation of the wave have been generally designated as "shear vibrations" in the literature of the piezoelectric art and will be so designated in this specification. The specification will also follow the standard terminology which employs X, Y and Z to designate the electric, the mechanical and the optical axes, respectively. The directions of the orthogonal geometrical axes of a piezoelectric body which is oriented with respect to axes X, Y, and Z will be designated by X', Y' and Z' respectively. When, for example, the orientation angle of a quartz plate oriented about an X axis reaches +31° the coefficient of coupling of the XY' shear frequency oscillations with each of the modes of oscillation, except the flexural mode, becomes zero. These couplings are small in the region of the critical angle of +31° and accordingly small changes or errors in orientation in this region do not introduce couplings that are large. Such an orientation permits greater tolerances in the manufacture of piezoelectric plates designed to execute vibrations of a given frequency than does the normal Y cut orientation in which the principal faces of the piezoelectric plate are parallel to the X and Z axes. In addition to its other important properties it appears that the temperature coefficient of frequency of such a piezoelectric plate is as low as $+20$ cycles in a million per degree C. This is lower than that of a normal Y cut crystal whose temperature coefficient is $+80$ to $+90$ cycles per million per degree C. This suggests the possibility that orientations might be devised at which a zero temperature coefficient of frequency would be obtained. Experimental studies which agree with theoretical consideration have led to the discovery of certain definite orientations having zero temperature coefficient and have disclosed the inherent relationships upon which these orientations depend. It has been found, for example, that with an orientation of $+31°$ about the X axis, the temperature coefficient of frequency is positive, but at an orientation of $+38°$ negative. Moreover, in this range the temperature coefficient changes with change in orientation in uniform manner and for thin, square plates the temperature coefficient passes through zero at approximately $+35°20'$. Tests of such $35°20'$ plates have shown that the frequency remains constant within limits of $\pm 1$ cycle per million per degree C. throughout the temperature range of $-40°$ to $+70°$ C. This is of very great importance in the case of crystal control units for aircraft in which variations of such an order in temperature are encountered. Even with temperature controlled ovens the difficulties of the usual crystal plates are not entirely overcome since it takes a certain amount of time for an inactive crystal taken from a cold stockroom and inserted in an aircraft transmitter by the attendant to attain the normal temperature for which it is designed. During that time the frequency not only departs from the normal operating frequency but is subject to the vagaries of so-called "hops" in consequence of couplings to extraneous modes of oscillation. The $+35°20'$ crystal is practically free from such "hops" since its couplings are of very small magnitude.

Fig. 1 shows a quartz piezoelectric element of the well-known Y cut or parallel face cut, the principal or electrode faces of which lie in planes parallel to both the optical (Z) and an electric (X) axes. As shown, the electric field is impressed between the electrodes in the direction of the Y axis.

Fig. 2 illustrates a right-hand quartz piezoelectric plate similar to that of Fig. 1, but oriented about an X or electric axis, in accordance with the principles of this invention. As illustrated, the principal or major plane Z'X of the plate lies at an angle of $\theta$ which may be $+35°20'$ with respect to the optical axis. Such a plate at ordinary temperatures exhibits a wave-length constant of 180 meters per millimeter, a frequency change with orientation errors theoretically less than 300 cycles in a million per 10' error in orientation, large electromechanical couplings, small mechanical couplings to extraneous modes of vibration, and a temperature coefficient of frequency which is zero at the correct orientation of approximately $+35°20'$ and which amounts to $\pm 1$ cycle in a million per degree C. for $\pm 15'$ error in orientation. The limits of this orientation, that is, the zone in which the temperature coefficient does not exceed $\pm 3$ parts in a million per degree C. are approximately $+35°$ and $+36°$.

The orientation at which zero temperature coefficients of frequency of a plate of piezoelectric material occur may be calculated from a knowledge of the dimensions of the plate, the elastic constants of the material and its density and the temperature coefficients of the dimensions, the elastic constants, and the density. For example, the frequency of the XY shear vibration of a Y cut quartz crystal which may be excited by an electric stress parallel to the Y axis is given by the equation $$f_0 = \frac{1}{2l}\sqrt{\frac{c_{66}}{\rho}} \qquad (1)$$

where $c_{66}$ is the elastic constant for quartz relating the shearing stress in the XY plane with the resulting shearing strain in the same plane (at room temperature approximately $39.1 \times 10^{10}$ dynes per cm.$^2$).

$\rho$ is the density of quartz (2.65 gms. per cm.$^3$)
$l$ is the thickness of the quartz plate in cm., and
$f_0$ is the natural frequency of vibration expressed in cycles per second.

The elastic constants of quartz are given by the well-known equations;

$$\begin{aligned}
-X_x &= c_{11}x_x + c_{12}y_y + c_{13}z_z + c_{14}y_z \\
-Y_y &= c_{12}x_x + c_{11}y_y + c_{13}z_z + c_{14}y_z \\
-Z_z &= c_{13}x_x + c_{13}y_y + c_{33}z_z \\
-Y_z &= c_{14}x_x - c_{14}y_y + c_{44}y_z \\
-Z_x &= c_{44}z_x + c_{14}x_y \\
-X_y &= c_{14}z_x + c_{66}x_y
\end{aligned} \qquad (2)$$

in which $X_x$, $Y_y$, $Z_z$ are linear or extensional stresses along the X, Y and Z axes respectively $x_x$, $y_y$ and $z_z$ are the concomitant extensional strains, $Y_z$, $Z_x$ and $X_y$ are shearing stresses in the YZ, ZX and XY planes respectively and $y_z$, $z_x$ and $x_y$ are the corresponding shearing strains.

The Equations 2 define the conditions which exist for the normal orientation of a quartz piezoelectric body in which its plane faces are each parallel to two of the orthogonal axes X, Y and Z of the mother crystal. Assuming that the quartz plate has some different orientation, e. g., that its principal plane faces are parallel to the X asis but oriented so as to be parallel to a new axis Z', at an angle $\theta$ to axis Z, the new constant $c'_{66}$ which must be applied to Equation 1 to determine the vibration frequency is obtained from the well-known transformation equation which follows:

$$c'_{66} = c_{44} \sin^2 \theta + c_{66} \cos^2 \theta - 2c_{14} \sin \theta \cos \theta \qquad (3)$$

Inasmuch as $c_{44}$, $c_{66}$ and $c_{14}$ are well-known constants it is a matter merely of computation to calculate the values of $c'_{66}$ for each angular orientation $\theta$ of the piezoelectric plate about the X axis.

As has been previously stated, a change in temperature affects the dimensions, the density and the elastic constants of a piezoelectric body. Assume for the conditions of Equation 1 i. e., for $x_y$ shear vibrations of a Y cut crystal that the temperature coefficient of length $l$ in the Y axis direction, of density $\rho$ of the material, of the elastic constant $c_{66}$, and of the frequency of vibration $f_0$, are respectively, $tl$, $t\rho$, $tc_{66}$ and $tf$. It may be readily deduced from a consideration of Equation 1 that $$tf = \frac{tc_{66}}{2} - \frac{t\rho}{2} - tl \qquad (4)$$

and for any orientation $\theta$ about the X axis $$tf' = \frac{tc'_{66}}{2} - \frac{tp'}{2} - tl' \quad (5)$$

Now $tp'$ and $tl'$ are well known for all orientations. It remains merely to find the values of $tc'_{66}$ in order to be able to plot the graph of $tf'$ for all orientations.

From Equation 3 it may be easily shown that $$c'_{66} tc'_{66} = c_{44} tc_{44} \sin^2 \theta + c_{66} tc_{66} \cos^2 \theta \quad (6)$$
$$- 2 c_{14} tc_{14} \sin \theta \cos \theta$$

The only unknown expressions of the second member of (6) are $tc_{44}$, $tc_{66}$ and $tc_{14}$. These may be obtained by solving three simultaneous equations which result from substitution in (6) of the known magnitudes of $tc'_{66}$ for any three angles. These three magnitudes are obtained from Equation 5 since for the angles $\theta = 0$, $\theta = +35°20'$ and $\theta = -35°20'$, $tf'$ has been carefully measured and found to be $+85$, $0$, and $+28$ respectively.

It is accordingly found that $tc_{66} = +162 \times 10^{-6}/c°$
$tc_{44} = -164 \times 10^{-6}/c°$
$tc_{14} = + 96 \times 10^{-6}/c°$ Substitution of these values for $tc_{66}$, $tc_{44}$ and $tc_{14}$ in Equation 6 enables $tc'_{66}$ to be determined for all orientations. It is, therefore, possible to calculate $tf'$ from Equation 5. A graph showing the calculated values of $tf'$ is shown in Fig. 11. This graph, points of which have been checked experimentally, shows that the temperature coefficient is not far from its maximum value for the Y cut, (parallel face cut). It shows that there are two quite definite orientations at which the temperature coefficient is zero. These are at $\theta = +35°20'$ and at $\theta = -49°$. The couplings to extraneous oscillations are relatively low at $+35°20'$ since they pass through a minimum at $\theta = 31°$. Moreover, piezoelectric activity as measured by the $d'26$ constant is strong at that orientation. At the $-49°$ orientation the temperature coefficient of frequency is also zero as shown by the graph in Fig. 11. The piezoelectric activity is, however, considerably less than at the $+35°20'$ orientation.

The foregoing discussion has been confined to orientations about the X axis. The principle of the invention, however, is not to be so limited since the same method of attack is available for determination of the zero temperature coefficients with still different orientations. It transpires that orientation of a Y cut quartz crystal about either the Z axis or the Y axis alone does not result in any orientations which yield a zero temperature coefficient for this type of vibration. However, by a combination of orientations attained by first orienting about one X axis and then orienting about another axis that a family of orientations may be determined for which the calculated temperature coefficient is zero. It is accordingly to be understood that the claims are intended to comprehend these as well as the species of the invention of which specific examples have been given.

In other words, the temperature coefficient of frequency of the piezoelectric plate is equal to the sum of various functions of the temperature coefficient of the dimensions involved, the temperature coefficient of the density of the material and the temperature coefficient of the elastic constants involved. Certain of these constituent temperature coefficients are in themselves functions of the orientations of the piezoelectric plate. It is accordingly necessary to determine the gamut of magnitudes of the various functions which added are equal to the temperature coefficient of frequency. If it be found that the sum of these functions passes through zero at a particular orientation as in the case of the $+35°20'$ and $-49°$ point of Fig. 11, a zero temperature coefficient orientation will have been determined.

The calculations which have been explained in detail relate to shear type vibrations in plates. It is to be understood, however, that the principle of the invention is not confined in its application to vibrations of this type, but is equally applicable to any other type of vibrations irrespective of their character and direction or how they are induced. Any particular vibration of a piezo electric body is the result of alternating strains induced by application of one or more alternating stresses. It is possible to express the frequency for a particular type of vibration under consideration in terms of the dimensions of the plate, the density of the material and the elastic constants involved. From the expression for frequency the expression for temperature coefficient of frequency of the plate may be readily obtained in terms of the temperature coefficient, of the dimensions of the body, and of the density and elastic constants of the material involved.

The theory underlying the invention is also applicable where it may be desired to produce devices having temperature coefficients which are not zero but are definite positive or negative quantities. It is also applicable where it may be desired to balance some opposite temperature coefficient.

Zero temperature coefficient orientations are of especial interest in connection with electric wave apparatus design or similar applications where it is desired to be able to produce a number of elements having characteristics that are very closely alike. Since the fundamental vibration frequency of such crystal plates changes but slightly with small orientation errors it is possible for plates of substantially the same characteristics to be produced in quantity without the necessity of extreme precautions to insure an absolutely accurate orientation. The zero temperature coefficient orientation also enables ovens to be dispensed with in cases where frequency stability with changing temperature is desired thus greatly simplifying the essential apparatus and reducing its cost.

Since the $+35°20'$ orientation depends upon the use of shear vibrations there are present flexural vibrations produced by the same shear strains and which cannot therefore be eliminated by orientation. However, the frequencies of the shear and the accompanying flexural vibrations are both functions of the plate thickness. Making the plate thinner increases the shear frequency but decreases the flexural frequency while making the plate thicker has the converse effect. Moreover, clamping of the periphery of the plate has the effect of greatly discriminating in favor of the shear frequency vibrations as against the flexural vibrations. Both of these expedients are useful in practical designs where the flexural vibration is to be suppressed.

Another advantage of the piezoelectric plate orientation of this invention is that in consequence of the low mutual couplings existing between the various modes of vibration it is possible to grind any of the edges or surfaces of a crystal to obtain the precise resonance frequency desired without experiencing any considerable effect on temperature coefficient such as commonly occur when crystals of conventional orientations are being ground to exact frequencies.

Fig. 3 illustrates a high power oscillator-modulator circuit directly controlled by a piezoelectric plate in accordance with this invention. The oscillator comprises an electron discharge device 1 of the usual three-element type having a cathode, an anode and an impedance control element. Associated with device 1 in the well-known constant current modulation circuit as disclosed in U. S. Patent to Heising 1,442,147, January 16, 1923, is a second three-element electron discharge device 2. Devices 1 and 2 are supplied in parallel with space current by a source 4 of unidirectional current in the series path of which a constant current choke coil 5 is connected. A large capacity condenser 6 shunts source 4 to provide a low impedance path for high frequency electromotive forces appearing at the terminals of the source without by-passing the modulating frequency oscillations. The grid circuit of the oscillator device comprises a quartz crystal plate 7 of the type disclosed in Fig. 2, connected in the usual manner between the grid and the cathode and shunted by a grid leak path including high resistance element 8 and milliammeter 9. The alternating current output circuit of the oscillator comprises variable tuned loop circuits 10 and 11 which are tuned respectively to the fundamental frequency $f$ of oscillation of piezoelectric plate 7 and to a harmonic $nf$ thereof. Inductively connected to each of these tuned circuits is the input circuit of a power amplifier 12 to the output circuit of which a radio transmitting antenna or high frequency line is connected. Accordingly, antenna 13 or a line circuit which may be used in lieu thereof may be employed to transmit speech modulated oscillations of the fundamental frequency of the crystal plate and antenna 14 may be similarly employed to transmit speech modulated oscillations of the harmonic frequency. The input circuit of the modulator tube 2 is associated with a conventional source of speech or other modulating currents which requires no description.

An important limitation of piezoelectric plates of the prior art is that concerned with the amount of oscillating power which they can readily transmit or control. When, for example, a crystal plate of the prior art has been associated with an electron discharge oscillator to control the frequency of the oscillations produced the amount of power which could be withdrawn from the oscillator has been rather seriously limited. As the power is increased the oscillating electromotive force to which the crystal is subjected increases and soon reaches a limit at which the crystal plate is punctured. Moreover, the piezoelectric plate rapidly heats up as the oscillating current traversing it increases. This heating effect is the result of a number of factors including the internal friction or viscosity of the material, corona and arcing between points of high potential difference and frictional engagement of the plate with its electrodes when executing complex vibrations. Accordingly, long before the puncture point is reached the temperature rises to such an extent as to cause the frequency to deviate from its initial magnitude by more than the permissible limit.

An oscillator circuit of the type shown in Fig. 3 employing a 1 kilowatt air cooled vacuum tube and the usual Y cut crystal may be made to produce an output of 5 to 10 watts of high frequency alternating current. Trouble with frequency shift because of crystal heating commences with usual crystal plates at as low an output as 5 watts. When the plate voltage has been increased to an electromotive force of under four hundred volts crystals of the hitherto known types puncture or break. Under very special circumstances and with critical adjustments it has been possible with crystals of the prior art to secure an output of high frequency alternating current power as high as 50 watts but only under laboratory conditions which are utterly impracticable for commercial work.

When crystals of the type disclosed in Fig. 2 are used in the circuit the arcing and corona effects are greatly reduced as the modes of oscillation are simplified and points of high potential difference are in general not nearly as closely adjacent as in the Y cut crystal. Superposed stresses at points in the crystal due to its simultaneously executing several vibrational modes do not occur and a mechanical rupture is reached only at much higher fundamental amplitude of mechanical vibration. The active resonances of the crystal are greatly simplified and the heating of the crystal plate occasioned internally of the crystal by oscillations of undesired types and externally by the frictional effects of such undesired oscillations at electrode contact points and by corona and arcing are greatly reduced. Along with the reduction in temperature and with the reduction in dangerous electromotive forces the crystal, because of its zero temperature characteristic, exhibits an independence of temperature with respect to its natural oscillation frequency. Using quartz crystal plates of the new type shown in Fig. 2 it is possible to operate the same 1 kilowatt tube at a plate voltage of 2000 volts and to produce 200 watts of useful 3000 kilocycle frequency current.

In consequence of the reduction in liability to puncture or break and of the stability of frequency with increased temperature it is possible to work the piezoelectric device at much higher output loads without deviation from its normal oscillation frequency and without puncture or break of the piezoelectric plate. An especially important result of this is that several stages of amplification may be omitted in producing piezoelectric controlled oscillations of considerable power because of the high power obtainable directly from such an oscillator. As a matter of fact it has been found that the performance of piezoelectric plates is improved in the direction of enabling the crystal to oscillate at higher frequencies. Whereas previous quartz crystal plates could be successfully operated only down to about 25 meter wave-lengths it is possible to operate quartz crystal plates according to this invention at 14 meter wave-lengths. Moreover, in addition to the increased base frequency oscillation power there are also odd multiple frequency overtones of correspondingly increased power so that it is possible to utilize crystals of commercially feasible dimensions such that accuracy in grinding is easier to attain to produce very high frequency oscillations. Although it has often been suggested in the prior art that so-called harmonic oscillations of crystal plates be utilized it has, in fact, not been easy to do so. In the first place the overtones produced by the piezoelectric plates of the prior art are not true harmonics but are dependent in their frequency upon coupled resonances which involve the various dimensions of the plate. It is therefore not possible to design a piezoelectric plate of previously known type for overtones by simple division of the dimension of a base frequency plate. Moreover, the overtone frequency oscillations of such prior art piezoelectric plates are also subject to variations in frequency with change of temperature.

In the circuit of Fig. 3 employing a crystal plate such as that of Fig. 2 the odd multiple frequency overtones like the fundamental frequency oscillations are relatively free from coupling to other modes of vibration and hence approach rather closely the harmonic frequencies. This at once simplifies the design of plates to be used for such overtones and assures that the frequencies obtained will be relatively independent of temperature variation effects.

Fig. 4 discloses a modification of the oscillator of Fig. 3 in which the grid circuit of the device 1 comprises a resistance element in series with a milliammeter. The quartz crystal plate which is of the type shown in Fig. 2 is connected directly between the grid and the anode. This is made feasible because with piezoelectric crystal plates designed in accordance with this invention the crystal oven and its heating circuits with their consequent capacity to earth may be omitted. Accordingly, connection of the piezoelectric plate between the grid and the anode is not attended with the introduction of such undesirable capacities to earth. It is, of course, to be understood that the oscillator circuit of Fig. 4 may be substituted in the system of Fig. 3 for the oscillator circuit shown therein or may be used otherwise.

Figure 5:
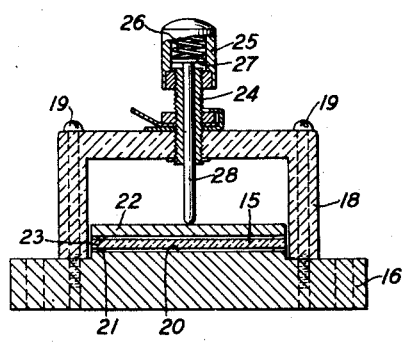

Fig. 5 shows in section a rectangular quartz crystal 15 and its clamping mounting. A heavy metallic base member 16 is provided with a cover member 18 of vitreous or other insulating material held in position on the base member by means of machine screws 19. Within the cover an integral raised portion 20 serves as the lower electrode for the crystal. The portion 20 has slightly raised lands 21 at its corners. A rectangular metallic plate 22 which serves as the upper electrode rests on the crystal 15 and contacts therewith at the corners by means of its downwardly projecting lands 23. A collar member 24 fixedly connected to the cover 18 has a threaded portion at its upper end which is engaged by an interiorly screw-threaded cap 25. Within the cap 25 a spring 26 presses on a plunger 27 to impel the sliding pin 28 which is integral therewith inwardly in contact with the upper electrode 22. It is accordingly possible to adjust the clamping pressure exerted by pin 28 by screwing the cap 25 to correspondingly compress the spring 26 to the desired degree.

Figure 6:
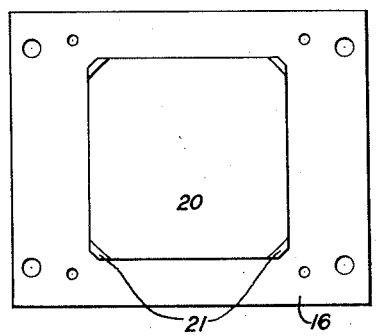

Fig. 6 is a plan view of the base plate 16 showing the raised portion 20 with its corner lands 21.

Figure 7:
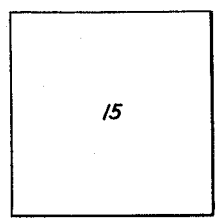

Fig. 7 is a plan view of the quartz crystal plate 15.

Figure 8:
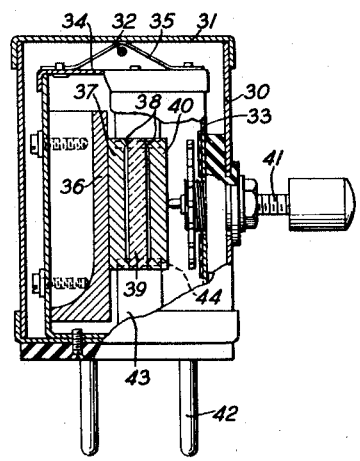
Figure 9:
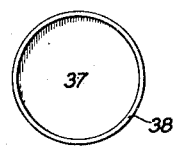
Figure 10:
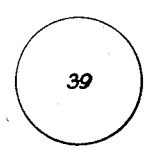

In Fig. 8 a somewhat different type of crystal housing comprises a container 30 provided with a cover 31 which is retained in position by a pin 32 passing through holes in the cover and the container. Within the container 30 is a receptacle 33 having a cover 34 which is held in place by a bow spring 35 which is held in contact with the cover 34 by the cover 31. Within the receptacle 33 there is a contacting base member 36 in contact with which is a circular plate electrode 37 a plan view of which is shown in Fig. 9 having a peripherally raised land 38 on one surface. A circular quartz crystal 39 a plan view of which is shown in Fig. 10 is clamped between the electrode plate 37 and a second electrode plate 40 also provided with a peripheral land 38 by a spring clamping arrangement 41 substantially identical with that disclosed in connection with Fig. 4. The piezoelectric plate 39 is engaged only adjacent its periphery by the peripheral lands 38 of the electrodes 37 and 40. Terminal connections are afforded by means of pins 42 projecting through the casing. Centering members 43 are positioned to loosely embrace the peripheral margins of the piezoelectric plate and its electrodes and extend partially therearound as indicated at 44.

It will be understood that the crystal plates 15 of Fig. 5 and 39 of Fig. 8 are each designed in accordance with the disclosure of Fig. 2 and are applicable for use in the circuits of Figs. 3 and 4.

What is claimed is:

1. A quartz piezoelectric element having an electrode face substantially parallel to an electric axis and inclined at an angle of substantially −49 degrees with respect to the optic axis as measured in a plane perpendicular to said electrode face.

2. A piezoelectric quartz plate having a low temperature coefficient of frequency, said frequency being dependent upon its thickness dimension which is small relative to its other or electrode face dimensions, and having an electrode face substantially parallel to an electric axis and inclined at an angle within the range extending substantially from −45 to −53 degrees with respect to the optic axis as measured in a plane substantially perpendicular to said electrode face.

3. A quartz piezoelectric element having its major surfaces substantially parallel to an electric axis and parallel to another axis which is perpendicular to said electric axis and inclined with respect to the optic axis at an angle of substantially −49° to produce a substantially zero temperature coefficient of frequency when said element is subjected to an electric field in a direction perpendicular to said major surfaces and vibrated in a shear mode at a frequency determined substantially by its thickness dimension perpendicular to said major surfaces.

4. A quartz piezoelectric element of substantially zero temperature coefficient of frequency adapted to vibrate in a shear mode at a frequency determined substantially by its thickness dimension perpendicular to its major surfaces, said major surfaces being substantially parallel to an X axis, inclined with respect to the Z axis at an angle of substantially 49° as measured in a plane perpendicular to said X axis, and inclined with respect to said Z axis in a negative sense or toward parallelism with the plane of a major apex face of the natural crystal from which said element is cut.

5. A quartz piezoelectric element of substantially zero temperature coefficient of frequency adapted to vibrate in a shear mode at a frequency determined substantially by its thickness dimension, having the shape of a plate the major surfaces of which are substantially parallel, and being so cut from the natural crystal that it is in effect a Y cut crystal element rotated about an X axis substantially −49° or toward parallelism with a major apex face of said natural crystal.

6. A piezoelectric quartz crystal element of low temperature coefficient of frequency having a major or electrode face substantially parallel to an X axis and inclined with respect to the Z axis at an angle of substantially −49 degrees as measured in a plane substantially perpendicular to said major face, said major face being substantially rectangular and having an edge substantially parallel to said X axis.

7. A piezoelectric quartz crystal element of low temperature coefficient of frequency having a major or electrode face substantially parallel to an X axis and inclined with respect to the Z axis at an angle within the range extending substantially from −45 to −53 degrees as measured in a plane substantially perpendicular to said major face, said major face being substantially square and having an edge substantially parallel to said X axis.

8. A piezoelectric quartz crystal element of low temperature coefficient of frequency adapted to vibrate at a frequency dependent mainly upon its thickness dimension perpendicular to its major plane, said major plane being substantially parallel to an X axis and inclined with respect to the Z axis substantially −49 degrees as measured in a plane perpendicular to said major plane, and said major plane being substantially square and having an edge thereof substantially parallel to said X axis.

9. A piezoelectric quartz crystal element of low temperature coefficient of frequency adapted to vibrate at a frequency dependent mainly upon its thickness dimension perpendicular to its major plane, said major plane being substantially parallel to an X axis and inclined with respect to the Z axis substantially −49 degrees as measured in a plane perpendicular to said major plane, and said major plane being of one of the shapes substantially square and circular.

10. A piezoelectric quartz crystal element of low temperature coefficient of frequency adapted to vibrate at a frequency dependent mainly upon its thickness dimension perpendicular to its major plane, said major plane being substantially parallel to an X axis and inclined with respect to the Z axis substantially −49 degrees as measured in a plane perpendicular to said major plane, and said major plane being substantially rectangular and having one of its edges substantially parallel to said X axis.

11. A piezoelectric quartz crystal element having its major plane inclined at an angle of substantially −49 degrees with respect to the Z axis as measured in a plane perpendicular to said major plane, and means for applying an electric field to said element in a direction perpendicular to said major plane for vibrating said element at a frequency of low temperature coefficient dependent substantially upon its thickness dimension perpendicular to said major plane.

12. A piezoelectric quartz crystal element of low temperature coefficient of frequency having its major plane substantially parallel to an X axis and inclined with respect to the Z axis at an angle not less than −45 degrees and not more than −53 degrees, and means for applying an electric field to said element in a direction perpendicular to said major plane for vibrating said element at a frequency dependent substantially upon its thickness dimension perpendicular to said major plane.

13. A piezoelectric quartz crystal element of low temperature coefficient of frequency having a substantially square major plane, said major plane having one edge substantially parallel to an X axis and another edge inclined substantially −49 degrees with respect to the Z axis, and means for applying an electric field to said element in a direction perpendicular to said major plane for vibrating said element at a frequency dependent substantially upon its thickness dimension perpendicular to said major plane.

14. A piezoelectric quartz crystal element of low temperature coefficient of frequency having a substantially rectangular major plane, said major plane having one edge substantially perpendicular to the Z axis and another edge inclined substantially −49 degrees with respect to the Z axis, and means for applying an electric field to said element in a direction perpendicular to said major plane for vibrating said element at a frequency dependent substantially upon its thickness dimension perpendicular to said major plane.

15. A piezoelectric quartz crystal element having its major faces substantially parallel to an X axis and inclined substantially −49 degrees with respect to the Z axis as measured in a plane perpendicular to said major faces, electrodes adjacent each of said major faces, and means for clamping said element between said electrodes.

16. A piezoelectric quartz crystal element having its major faces substantially parallel to an X axis and inclined substantially −49 degrees with respect to the Z axis as measured in a plane perpendicular to said major faces, electrodes adjacent each of said major faces, and means for clamping the periphery of said element.

17. A piezoelectric quartz crystal element having substantially square major faces, said major faces having one edge substantially parallel to an X axis and another edge inclined substantially −49 degrees with respect to the Z axis, means including electrodes adjacent said major faces for vibrating said element at a frequency dependent substantially upon its thickness dimension perpendicular to said major faces, and means for clamping said element adjacent the corners thereof.

18. A piezoelectric quartz crystal element adapted for operation at an odd harmonic or overtone of its fundamental mode vibrational frequency dependent substantially upon its thickness dimension perpendicular to its major plane and its electrode faces, said major plane being substantially parallel to an X axis and inclined wtih respect to the Z axis substantially −49 degrees as measured in a plane perpendicular to said major plane, said angle being such as to obtain a low temperature coefficient for said harmonic of said fundamental mode frequency.

19. A piezoelectric quartz crystal element having substantially rectangular electrode faces, said electrode faces having an edge substantially parallel to an X axis and another edge inclined substantially −49 degrees with respect to the Z axis, and means including electrodes adjacent said faces for applying a field thereto of a frequency corresponding to a desired odd harmonic of the fundamental mode frequency and dependent substantially upon its thickness dimension which is substantially perpendicular to said electrode faces.

GERALD W. WILLARD.